(12) United States Patent
Kim et al.

(10) Patent No.: US 12,200,450 B2
(45) Date of Patent: *Jan. 14, 2025

(54) SHARED SPEECH PROCESSING NETWORK FOR MULTIPLE SPEECH APPLICATIONS

(71) Applicant: QUALCOMM Incorporated, San Diego, CA (US)

(72) Inventors: Lae-Hoon Kim, San Diego, CA (US); Sunkuk Moon, San Diego, CA (US); Erik Visser, San Diego, CA (US); Prajakt Kulkarni, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/324,622

(22) Filed: May 26, 2023

(65) Prior Publication Data
US 2023/0300527 A1 Sep. 21, 2023

Related U.S. Application Data

(63) Continuation of application No. 17/650,595, filed on Feb. 10, 2022, now Pat. No. 11,700,484, which is a
(Continued)

(51) Int. Cl.
*H04R 3/00* (2006.01)
*G06F 18/21* (2023.01)
(Continued)

(52) U.S. Cl.
CPC ........... *H04R 3/005* (2013.01); *G06F 18/217* (2023.01); *G06N 20/00* (2019.01); *G06V 10/82* (2022.01);
(Continued)

(58) Field of Classification Search
CPC ...... H04R 3/005; H04R 5/04; H04R 2420/07; H04R 2499/13; H04R 2430/20; G06F 18/217; G06F 3/167; G06N 20/00; G06N 3/044; G06N 3/045; G06N 3/084; H04L 65/80; H04L 65/60; H04L 65/1016; H04L 65/1069; G10L 21/02; G10L 15/28;
(Continued)

(56) References Cited

U.S. PATENT DOCUMENTS 9,380,155 B1 6/2016 Reding et al.
11,276,415 B2 3/2022 Kim et al.
(Continued)

OTHER PUBLICATIONS

Devlin J., et al., "BERT: Pre-Training of Deep Bidirectional Transformers for Language Understanding", arXiv:1810.04805v2 [cs. CL], May 24, 2019, 16 pages.

*Primary Examiner* — Yogeshkumar Patel
(74) *Attorney, Agent, or Firm* — QUALCOMM Incorporated

(57) ABSTRACT

A device to process speech includes a speech processing network that includes an input configured to receive audio data. The speech processing network also includes one or more network layers configured to process the audio data to generate a network output. The speech processing network includes an output configured to be coupled to multiple speech application modules to enable the network output to be provided as a common input to each of the multiple speech application modules.

30 Claims, 11 Drawing Sheets

Related U.S. Application Data continuation of application No. 16/844,836, filed on Apr. 9, 2020, now Pat. No. 11,276,415.

(51) Int. Cl.
| | | |
|---|---|---|
| *G06N 20/00* | (2019.01) | |
| *G06V 10/82* | (2022.01) | |
| *G06V 20/20* | (2022.01) | |
| *G10L 21/02* | (2013.01) | |
| *H04L 65/60* | (2022.01) | |
| *H04L 65/80* | (2022.01) | |
| *H04R 5/04* | (2006.01) | |

(52) U.S. Cl.
CPC .............. *G06V 20/20* (2022.01); *G10L 21/02* (2013.01); *H04L 65/60* (2013.01); *H04L 65/80* (2013.01); *H04R 5/04* (2013.01); *H04R 2420/07* (2013.01); *H04R 2499/13* (2013.01)

(58) Field of Classification Search
CPC ......... G10L 17/02; G10L 25/30; G06V 10/82; G06V 20/20

See application file for complete search history.

(56) References Cited

U.S. PATENT DOCUMENTS

| | | | | |
|---|---|---|---|---|
| 11,700,484 | B2* | 7/2023 | Kim | G06N 3/084 |
| | | | | 704/200 |
| 2006/0129406 | A1* | 6/2006 | Mandalia | G10L 15/30 |
| | | | | 704/E15.047 |
| 2007/0038461 | A1* | 2/2007 | Abbott | G10L 15/30 |
| | | | | 704/E15.047 |
| 2008/0140390 | A1* | 6/2008 | Xia | G06F 9/52 |
| | | | | 718/107 |
| 2015/0120290 | A1 | 4/2015 | Shagalov | |
| 2015/0310858 | A1* | 10/2015 | Li | G10L 15/16 |
| | | | | 704/232 |
| 2017/0178666 | A1* | 6/2017 | Yu | G10L 25/30 |
| 2017/0256254 | A1* | 9/2017 | Huang | G10L 15/02 |
| 2017/0270100 | A1 | 9/2017 | Audhkhasi et al. | |
| 2019/0080692 | A1* | 3/2019 | R | G10L 21/0272 |
| 2021/0319801 | A1 | 10/2021 | Kim et al. | |
| 2022/0165285 | A1 | 5/2022 | Kim | |

* cited by examiner

SHARED SPEECH PROCESSING NETWORK FOR MULTIPLE SPEECH APPLICATIONS

I. CROSS-REFERENCE TO RELATED APPLICATION(S)

The present application claims priority from and is a continuation application of U.S. patent application Ser. No. 17/650,595, filed Feb. 10, 2022, and entitled "SHARED SPEECH PROCESSING NETWORK FOR MULTIPLE SPEECH APPLICATIONS," which claims priority from and is a continuation application of U.S. patent application Ser. No. 16/844,836, filed Apr. 9, 2020, entitled "SHARED SPEECH PROCESSING NETWORK FOR MULTIPLE SPEECH APPLICATIONS," and issued as U.S. Pat. No. 11,276,415, the content of each of which is incorporated herein by reference in its entirety.

II. FIELD

The present disclosure is generally related to speech processing.

III. DESCRIPTION OF RELATED ART

Advances in technology have resulted in smaller and more powerful computing devices. For example, a variety of portable personal computing devices, including wireless telephones such as mobile and smart phones, tablets, and laptop computers are small, lightweight, and easily carried by users. These devices can communicate voice and data packets over wireless networks. Further, many such devices incorporate additional functionality such as a digital still camera, a digital video camera, a digital recorder, and an audio file player. Also, such devices can process executable instructions, including software applications, such as a web browser application, that can be used to access the Internet. As such, these devices can include significant computing capabilities.

Many such devices perform processing of speech for various purposes. For example, speech recognition devices, such as virtual assistants, can translate spoken commands into actions that are to be performed. As another example, speaker identification can identify a user based on voice or speech characteristics, such as to determine whether a speaker is an authorized user of the device. Neural networks have become popular to enable speech processing due to the high performance attainable using neural networks as compared to alternative techniques. However, neural network applications for speech processing can be computation-intensive with a relatively large memory footprint and, in general, improvements in speech processing performance are usually associated with increases in the complexity and model size of the neural network applications.

As a result, high-performance neural network speech processing can be difficult to deploy in memory- or computation-constrained environments, such as a smart phone, a "smart watch," or another battery-powered personal electronic device. Additionally, because different aspects of speech processing implement different models, memory and computation constraints further impact the number of speech processing applications that can be concurrently run at such devices. For example, concurrently processing audio data to concurrently perform both speech recognition (e.g., recognizing speech in a speaker-agnostic manner) and speaker identification (e.g., recognizing a speaker in a speech-agnostic manner) can double the computation and memory usage as compared to performing speech recognition or speaker identification individually.

Various techniques have been introduced to improve the efficiency of applying neural network-based solutions in other contexts, such as text-based tasks. As an example, Bidirectional Encoder Representations from Transformers (BERT) is a technique for language understanding that reduces an amount of training time required to generate models for specific tasks related to language understanding. In BERT, a model is pre-trained using unlabeled textual input, and the pre-trained model can subsequently be fine-tuned for use with different text-based tasks, such as question answering and language inference, without substantial task-based architecture modifications.

Although techniques such as BERT can reduce the development time associated with creating text-based applications, the techniques do not alleviate the underlying issue of providing multiple speech processing models concurrently in a constrained environment. Solutions that enable concurrent, high-performance speech processing applications to be performed in a resource-constrained environment can improve a user experience, such as by enabling concurrently keyword detection and speaker authentication from a single phrase uttered by the user instead of requiring the user to speak one phrase for speaker authentication and a second phrase for keyword detection, as an illustrative, non-limiting example.

IV. SUMMARY

According to one implementation of the techniques disclosed herein, a device includes a speech processing network that includes an input configured to receive audio data corresponding to audio captured by one or more microphones. The speech processing network also includes one or more network layers configured to process the audio data to generate an output representation of the audio data. The speech processing network includes an output configured to be coupled to multiple speech application modules to enable the output representation to be provided as a common input to each of the multiple speech application modules.

According to another implementation of the techniques disclosed herein, a method of speech processing includes receiving, at a speech processing network, audio data corresponding to audio captured by one or more microphones. The method includes processing, at the speech processing network, the audio data to generate an output representation of the audio data. The method also includes providing the output representation at an output of the speech processing network to enable the output representation to be accessible as a common input to multiple speech application modules.

According to another implementation of the techniques disclosed herein, a non-transitory computer-readable medium includes instructions that, when executed by one or more processors, cause the one or more processors to receive, at a speech processing network, audio data corresponding to audio captured by one or more microphones. The instructions, when executed by the one or more processors, cause the one or more processors to process, at the speech processing network, the audio data to generate an output representation of the audio data. The instructions, when executed by the one or more processors, cause the one or more processors to provide the output representation at an output of the speech processing network to enable the output representation to be accessible as a common input to multiple speech application modules.

According to another implementation of the techniques disclosed herein, an apparatus includes means for receiving audio data corresponding to audio captured by one or more microphones. The apparatus also includes means for processing the audio data to generate an output representation of the audio data. The apparatus further includes means for providing the output representation to be accessible as a common input to multiple means for performing speech applications.

Other implementations, advantages, and features of the present disclosure will become apparent after review of the entire application, including the following sections: Brief Description of the Drawings, Detailed Description, and the Claims.

V. BRIEF DESCRIPTION OF THE DRAWINGS

VI. DETAILED DESCRIPTION

Figure 1:
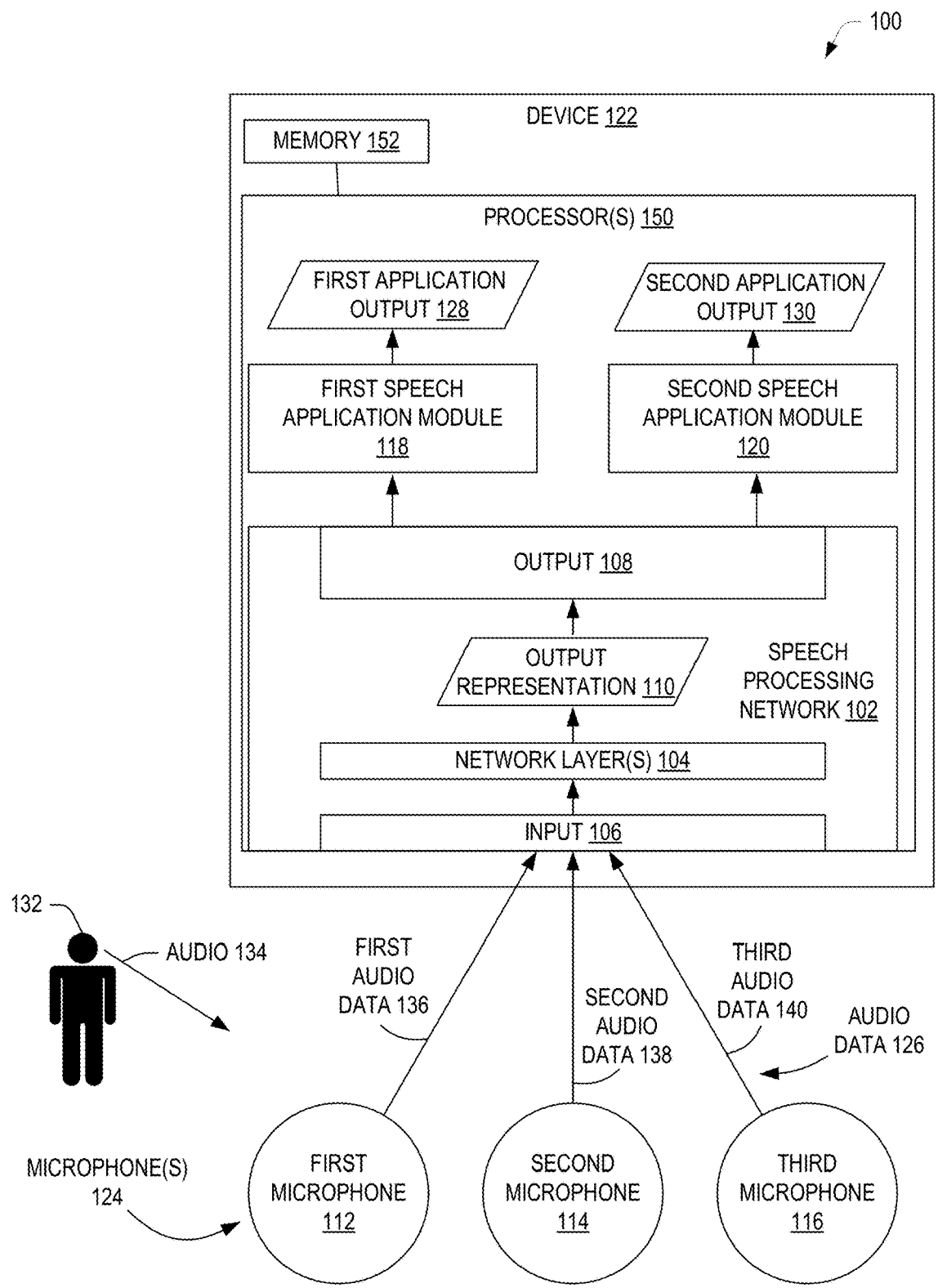
FIG. 1 is a diagram of a particular illustrative implementation of a system including a device that includes a shared speech processing network for multiple speech applications, in accordance with some examples of the present disclosure.

A shared speech processing network for multiple speech applications is described. Because high-performance neural network-based speech processing can be computation-intensive with a relatively large memory footprint, conventional neural network speech processing can be difficult to deploy in memory- or computation-constrained devices. Additionally, because different models are used for different aspects of speech processing conventionally, memory and computation constraints further impact the number of speech processing applications that can be concurrently run at such devices.

The shared speech processing network for multiple speech applications of the present disclosure is configured to generate, for an audio input, an output that is appropriate for use by multiple different speech processing applications. In some implementations, the shared speech processing network processes a microphone input to generate an embedding (e.g., a feature vector) representative of the microphone input. The embedding is provided as a common output to multiple neural networks that are each configured to perform different speech applications. As used herein, the term "common" is used in accordance with its dictionary definition of "shared by, coming from, or done by more than one." It should be noted that the term "common" is not used herein as a synonym for "usual," "ordinary," or "customary." Instead, the term "conventional" is used to indicate that which is usual, ordinary, or customary.

In some implementations, the shared speech processing network is trained to reduce losses associated with multiple speech processing applications, such as speech enhancement, speech recognition, and speaker recognition (as non-limiting examples), to generate an output that provides high-quality information for use by each of the speech processing applications. Because each of the speech processing applications uses the common output, at least a portion of the processing that conventionally would be performed independently, and thus duplicated, by each of the speech processing applications is instead performed by the shared speech processing network. As a result, each of the speech processing applications can have a smaller model with reduced computation and memory requirement as compared to conventional applications, and the smaller models can be more efficiently trained as compared to conventional models. Further, overall computation and memory usage are reduced by reducing or removing duplication of processing among concurrently executing speech processing models.

In addition to reducing or removing duplication of processing between multiple concurrent speech processing applications, in some implementations processing resource (e.g., digital signal processor (DSP) or other processor cores) usage is further reduced using a hardware implementation of the shared speech processing network. Because the network topology and coefficients associated with the shared speech processing network are set independently of any later-added speech processing applications, the network topology, the coefficients, or both, can be implemented using dedicated circuitry for faster performance, reduced power consumption, and reduced use of processor resources and memory.

Particular aspects of the present disclosure are described below with reference to the drawings. In the description, common features are designated by common reference numbers. As used herein, various terminology is used for the purpose of describing particular implementations only and is not intended to be limiting of implementations. For example, the singular forms "a," "an," and "the" are intended to include the plural forms as well, unless the context clearly indicates otherwise. It may be further understood that the terms "comprise," "comprises," and "comprising" may be used interchangeably with "include," "includes," or "including." Additionally, it will be understood that the term "wherein" may be used interchangeably with "where." As used herein, "exemplary" may indicate an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to one or more of a particular element, and the term "plurality" refers to multiple (e.g., two or more) of a particular element.

In the present disclosure, terms such as "determining," "calculating," "estimating," "shifting," "adjusting," etc. may be used to describe how one or more operations are performed. It should be noted that such terms are not to be construed as limiting and other techniques may be utilized to perform similar operations. Additionally, as referred to herein, "generating," "calculating," "estimating," "using," "selecting," "accessing," and "determining" may be used interchangeably. For example, "generating," "calculating," "estimating," or "determining" content (or a signal) may refer to actively generating, estimating, calculating, or determining the content (or the signal) or may refer to using, selecting, or accessing the content (or signal) that is already generated, such as by another component or device.

As used herein, "coupled" may include "communicatively coupled," "electrically coupled," or "physically coupled," and combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive electrical signals (digital signals or analog signal) directly or indirectly, such as via one or more wires, buses, networks, etc.

Figure 6:
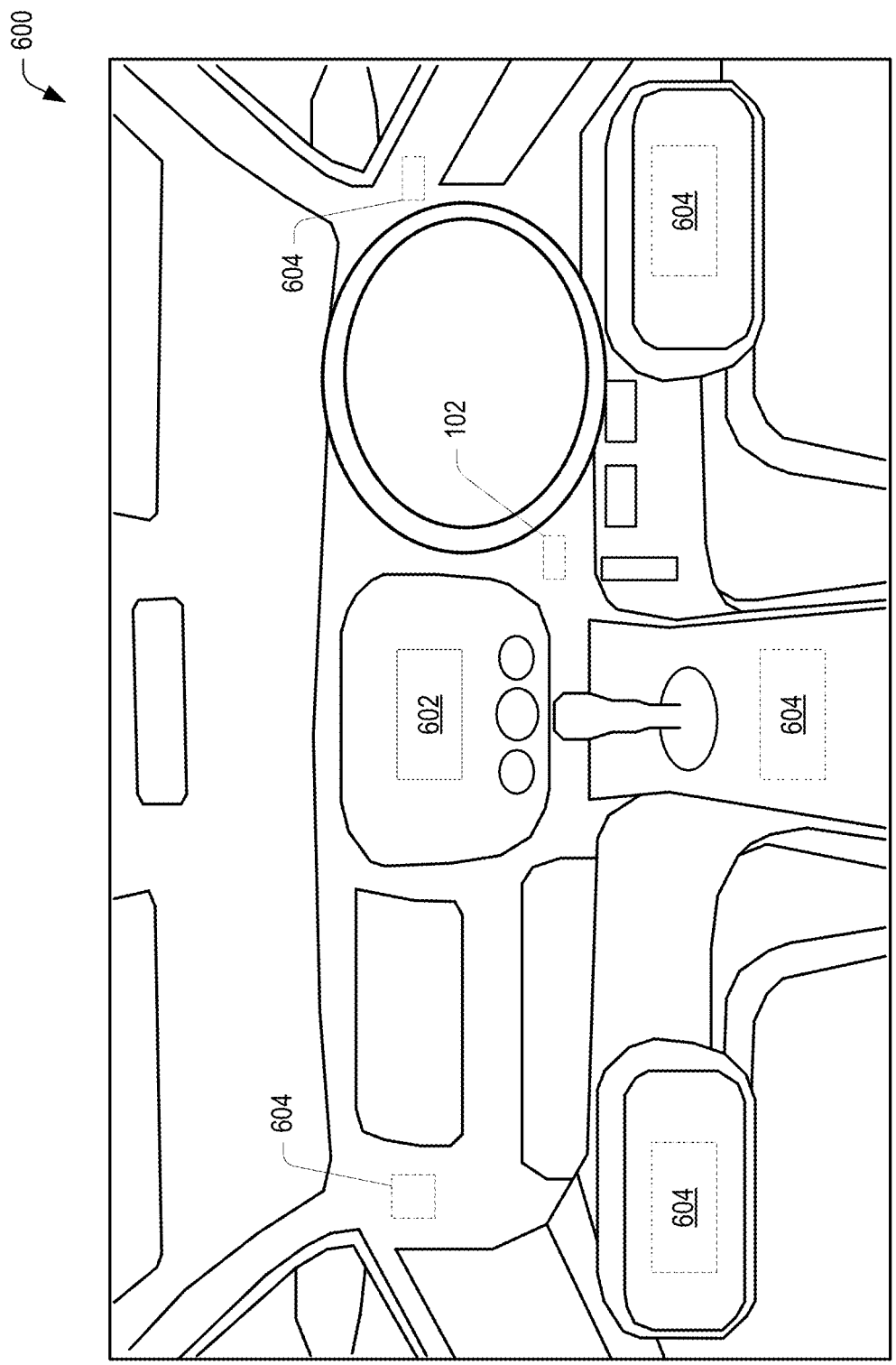
FIG. 6 is a diagram of a first example of a vehicle that includes a shared speech processing network for multiple speech applications, in accordance with some examples of the present disclosure.
Figure 7:
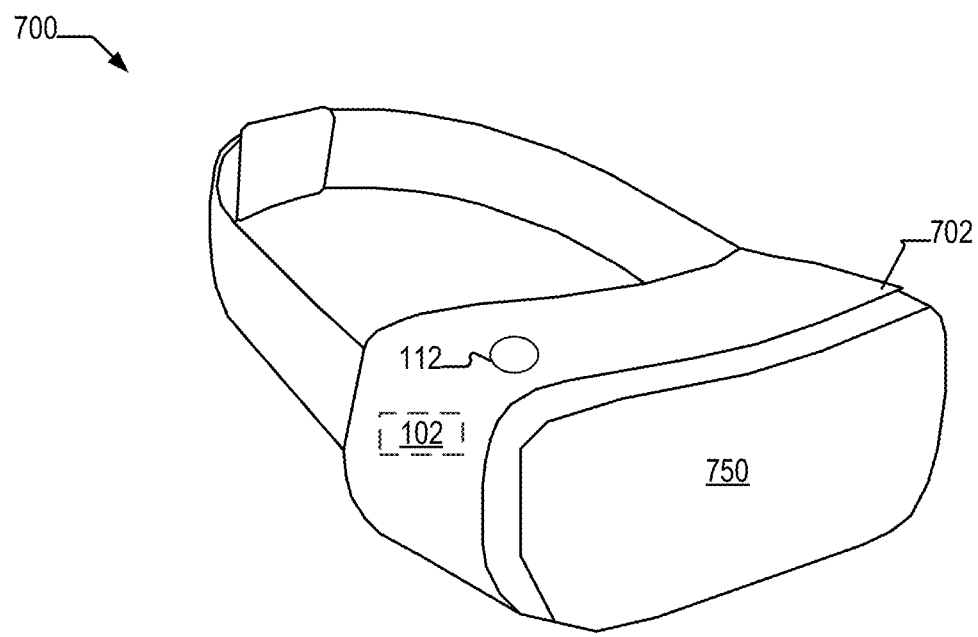
FIG. 7 is a diagram of a headset, such as a virtual reality or augmented reality headset, that includes a shared speech processing network for multiple speech applications, in accordance with some examples of the present disclosure.
Figure 8:
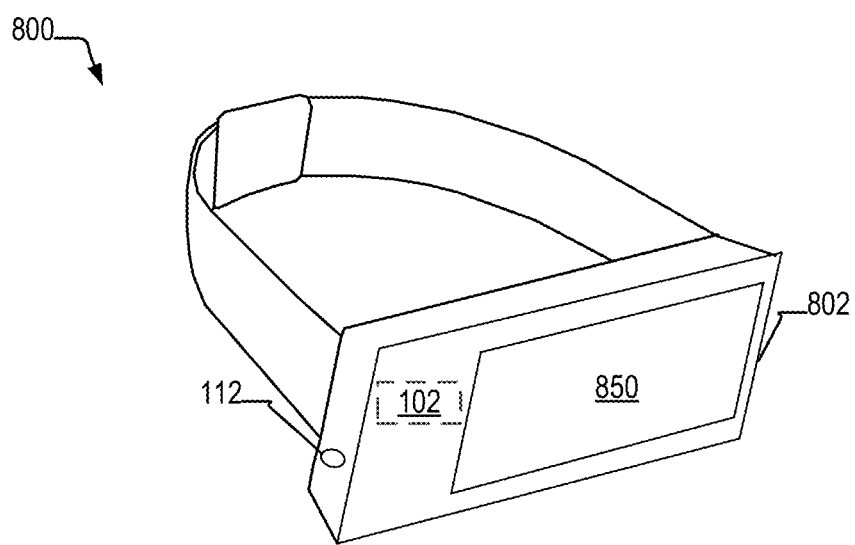
FIG. 8 is a diagram of a wearable electronic device that includes a shared speech processing network for multiple speech applications, in accordance with some examples of the present disclosure.
Figure 9:
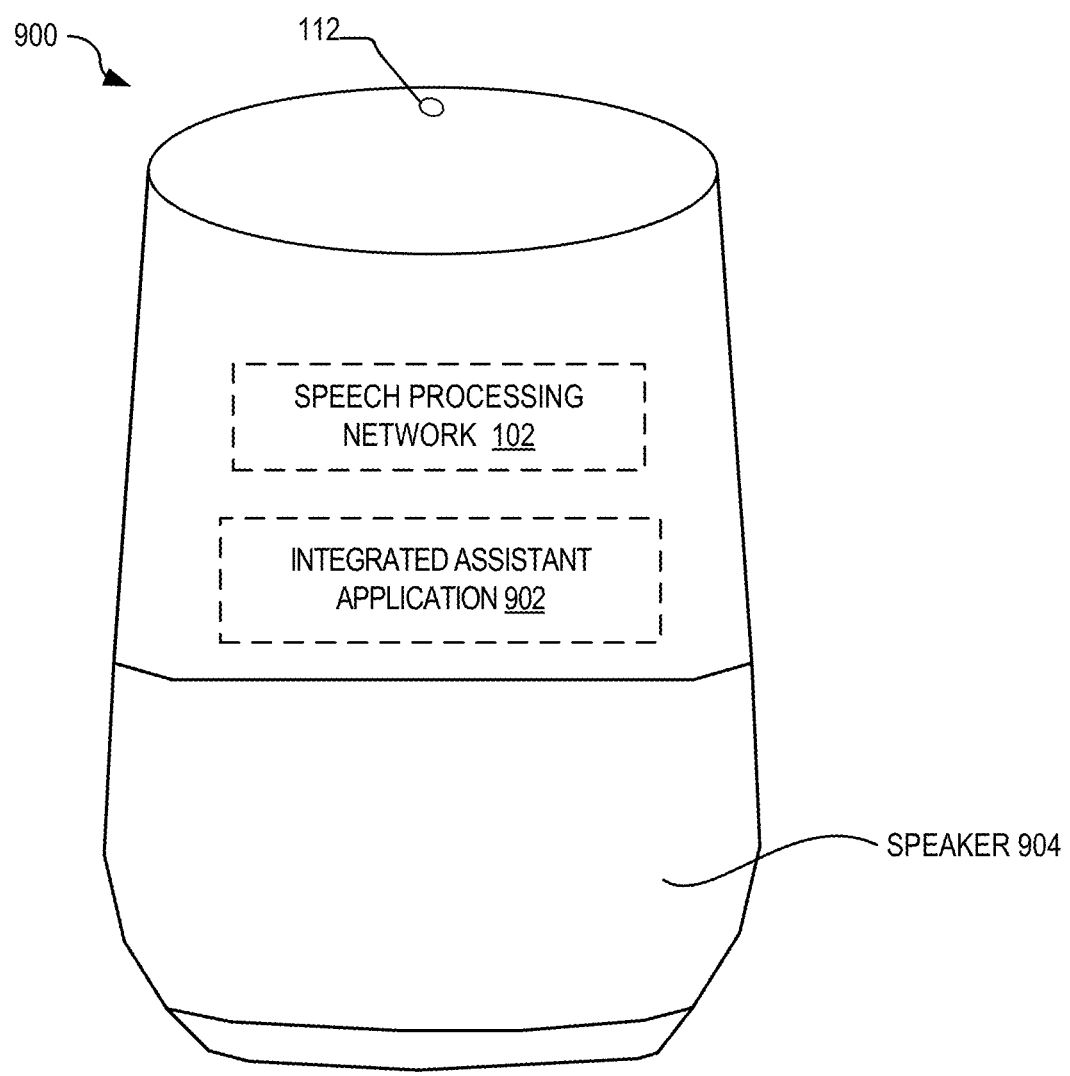
FIG. 9 is a diagram of a voice-controlled speaker system that includes a shared speech processing network for multiple speech applications, in accordance with some examples of the present disclosure.
Figure 11:
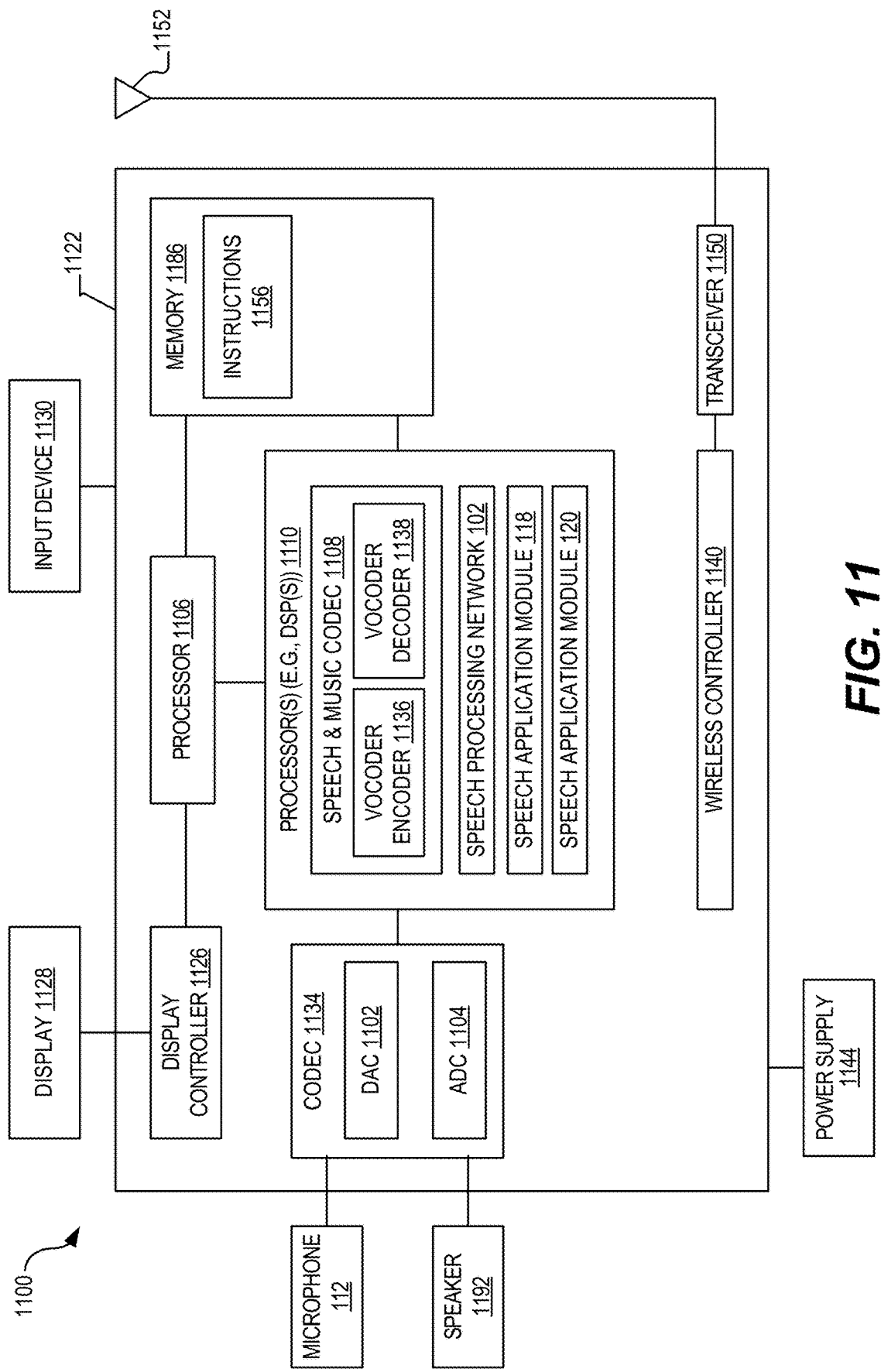
FIG. 11 is a block diagram of a particular illustrative example of a device that includes a shared speech processing network for multiple speech applications, in accordance with some examples of the present disclosure.
Figure 12:
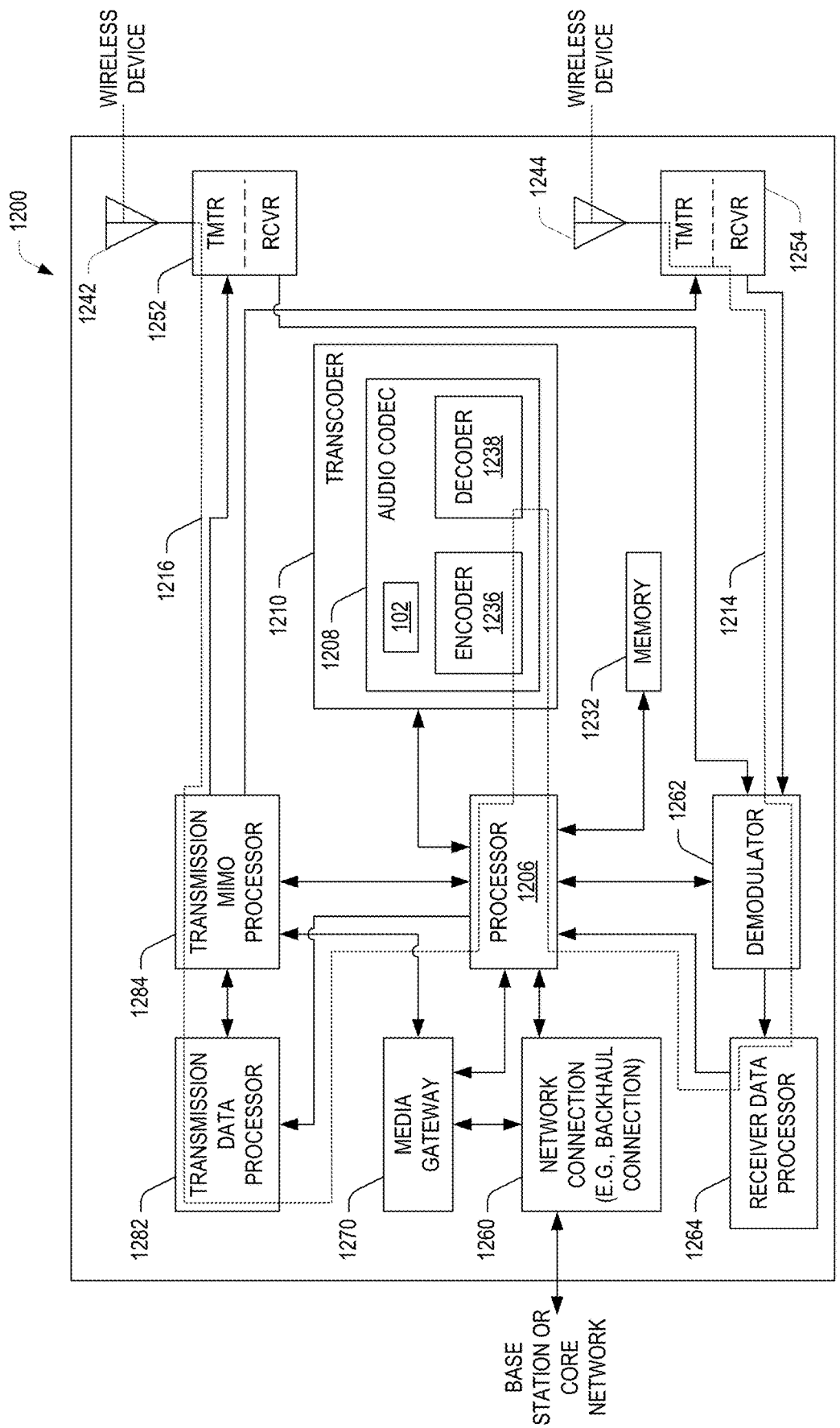
FIG. 12 is a block diagram of a particular illustrative example of a base station that includes a shared speech processing network for multiple speech applications, in accordance with some examples of the present disclosure.

Referring to FIG. 1, an illustrative example of a system 100 is shown. The system 100 includes a device 122 that is configured to process speech and includes a speech processing network 102. The speech processing network 102 is configured to receive audio data 126 from one or more microphones 124 and to process the audio data 126 to generate an output representation 110 as a common output that is used by multiple speech application modules. In some implementations, the device 122 corresponds to or is included in a vehicle, such as depicted in FIG. 6, a headset, such as depicted in FIG. 7, a wearable electronic device, such as depicted in FIG. 8, a smart speaker system, such as depicted in FIG. 9, or a communication device such as a portable electronic device, as depicted in FIG. 11, or a base station, as depicted in FIG. 12.

The one or more microphones 124 are configured to capture audio, such as audio 134 (e.g., speech) from a user 132. The one or more microphones 124 include a first microphone 112 configured to generate first audio data 136, a second microphone 114 configured to generate second audio data 138, and a third microphone 116 configured to generate third audio data 140. The first audio data 136, the second audio data 138, and the third audio data 140 are received at the device 122 as the audio data 126. According to one implementation, one or more of the first audio data 136, the second audio data 138, or the third audio data 140 is an analog signal. According to another implementation, one or more of the first audio data 136, the second audio data 138, or the third audio data 140 is a digital signal. For example, in response to capturing the audio 134, each of the first microphone 112, second microphone 114, and third microphone 116 can perform a respective analog-to-digital conversion (ADC) operation to convert the audio 134 to a respective digital signal. Although three microphones are illustrated, other implementations can include any other number of microphones, such as one microphone, two microphones, or four or more microphones.

The device 122 includes one or more processors 150 coupled to a memory 152. The one or more processors 150 include a speech processing network 102, a first speech application module 118, and a second speech application module 120. Although two speech application modules 118 and 120 are illustrated, in other implementations three or more speech application modules can be used, such as described further with reference to FIG. 2 and FIG. 3.

In some implementations, one or more of the speech processing network 102, the first speech application module 118, or the second speech application module 120 are implemented via execution, by the one or more processors 150, of instructions stored at the memory 152. According to one implementation, one or more components of the one or more processors 150 (e.g., the input 106, the one or more network layers 104, the output 108, the first speech application module 118, and the second speech application module 120) can be implemented using dedicated circuitry, such as an application-specific integrated circuit (ASIC) or a field-programmable gate array (FPGA).

The speech processing network 102 includes an input 106, one or more network layers 104, and an output 108. The input 106 is configured to receive audio data 126 corresponding to audio captured by the one or more microphones 124. In an example, the input 106 includes one or more bus interfaces, such as a multi-channel audio bus interface, to enable the audio data 126 to be received from the one or more microphones 124.

The one or more network layers 104 are configured to process the audio data 126 to generate an output representation 110 of the audio data 126. In a particular implementation, the one or more network layers 104 include stacked long short-term memory (LSTM), gated recurrence unit (GRU) layers, or a combination thereof. The output 108 is configured to be coupled to multiple speech application modules to enable the output representation 110 to be provided as a common input to each of the multiple speech application modules 118 and 120. For example, the output 108 can include one or more bus interfaces, one or more registers or buffers, or a dedicated region of a memory that is accessible to the first speech application module 118 and the second speech application module 120.

The first speech application module 118 is coupled to the output 108 and is configured to generate a first application output 128 based on the output representation 110. In an illustrative example, the first speech application module 118 corresponds to at least one of a speech recognition network, a voice activation detector, a speaker verifier, a speaker recognizer, or a speech enhancer. In some implementations, a speech recognition network is configured to output text corresponding to input data, a voice activation detector is configured to generate an output representative of whether a wake-up phrase (e.g., "Hey, Snapdragon") has been detected in the input data, a speaker verifier is configured to generate an output indicative of whether the input data exhibits voice characteristics matching a particular speaker, a speaker recognizer is configured to generate an output indicating which of several stored speaker profiles match the voice characteristics exhibited in the input data, and a speech enhancer is configured to enhance the audio associated with the input data (e.g., denoising, echo cancellation, etc.) such as to generate an enhanced speech signal for telephone, playback, etc.

The second speech application module 120 is coupled to the output 108 and is configured to generate a second application output 130 based on the output representation 110. The second application output 130 is different than the first application output 128. For example, in one implementation the first speech application module 118 is a speech enhancer and the second speech application module 120 is a speaker recognizer, while in another implementation the first speech application module 118 is a speech recognizer and the second speech application module 120 is a speaker verifier.

During operation, the one or more microphones 124 capture the audio data 126 responsive to receiving the audio 134. The audio data 126 is received at the input 106 and processed at the one or more network layers 104 to generate the output representation 110. The output representation 110 is provided as an input to the first speech application module 118 and to the second speech application module 120.

The first speech application module 118 and the second speech application module 120 operate in parallel with each other, with the first speech application module 118 processing the output representation 110 concurrently with the second speech application module 120 processing the output representation 110. The first application output 128 (e.g., text generated during speech recognition) and the second application output 130 (e.g., a verification of whether the source of the audio 134 matches stored speech characteristics associated with the user 132) are provided to one or more other applications (not shown), such as a digital voice assistant.

The combination of the speech processing network 102 and the first speech application module 118 operates in a similar manner as a multi-stage speech application module, with the speech processing network 102 functioning as a first stage and the first speech application module 118 functioning as a second stage. The combination of the speech processing network 102 and the second speech application module 120 also operate in a similar manner as a multi-stage speech application module, with the speech processing network 102 functioning as a first stage and the second speech application module 120 functioning as a second stage. By "sharing" the first stage among multiple speech processing applications, overall power consumption and memory usage is reduced as compared to concurrently running multiple conventional speech processing applications.

In some implementations, prior to the speech processing network 102 being incorporated into the device 122, the one or more network layers 104 are trained to reduce or minimize losses associated with using the output representation 110 in a variety of different applications so that the output representation 110 is broadly applicable for use in a wide range of speech processing applications. For example, the one or more network layers 104 may be trained based on at least a first performance metric associated with a first speech application module and a second performance metric associated with a second speech application module, which may be the same as, or different from, the first speech application module 118 and the second speech application module 120, respectively. In an example, the one or more network layers 104 are trained responsive to a combined performance metric that corresponds to a combination of at least the first performance metric and the second performance metric. To illustrate, the first speech application module may include at least one of a speech enhancement module, a speech recognition module, or a speaker recognition module. The second speech application module may include a different one of the speech enhancement module, the speech recognition module, or the speaker recognition module, or may include a different type of module. An example of training of the one or more network layers 104 is provided with reference to FIG. 4.

Because each of the speech application modules 118 and 120 uses the common output representation 110, at least a portion of the processing that conventionally would be performed independently, and thus duplicated, by each of the speech application modules 118 and 120 is instead performed by the shared speech processing network 102. As a result, overall computation and memory usage are reduced by reducing or removing duplication of processing by sharing the speech processing network 102. Further, each of the speech application modules 118 and 120 can have a smaller model with reduced computation and memory requirement as compared to conventional applications, and the smaller models can be more efficiently trained as compared to conventional models. Additional speech processing applications that use the output representation 110 as the input to be processed may be developed and later added, such as via an end-user initiated download to the device 122.

Figure 2:
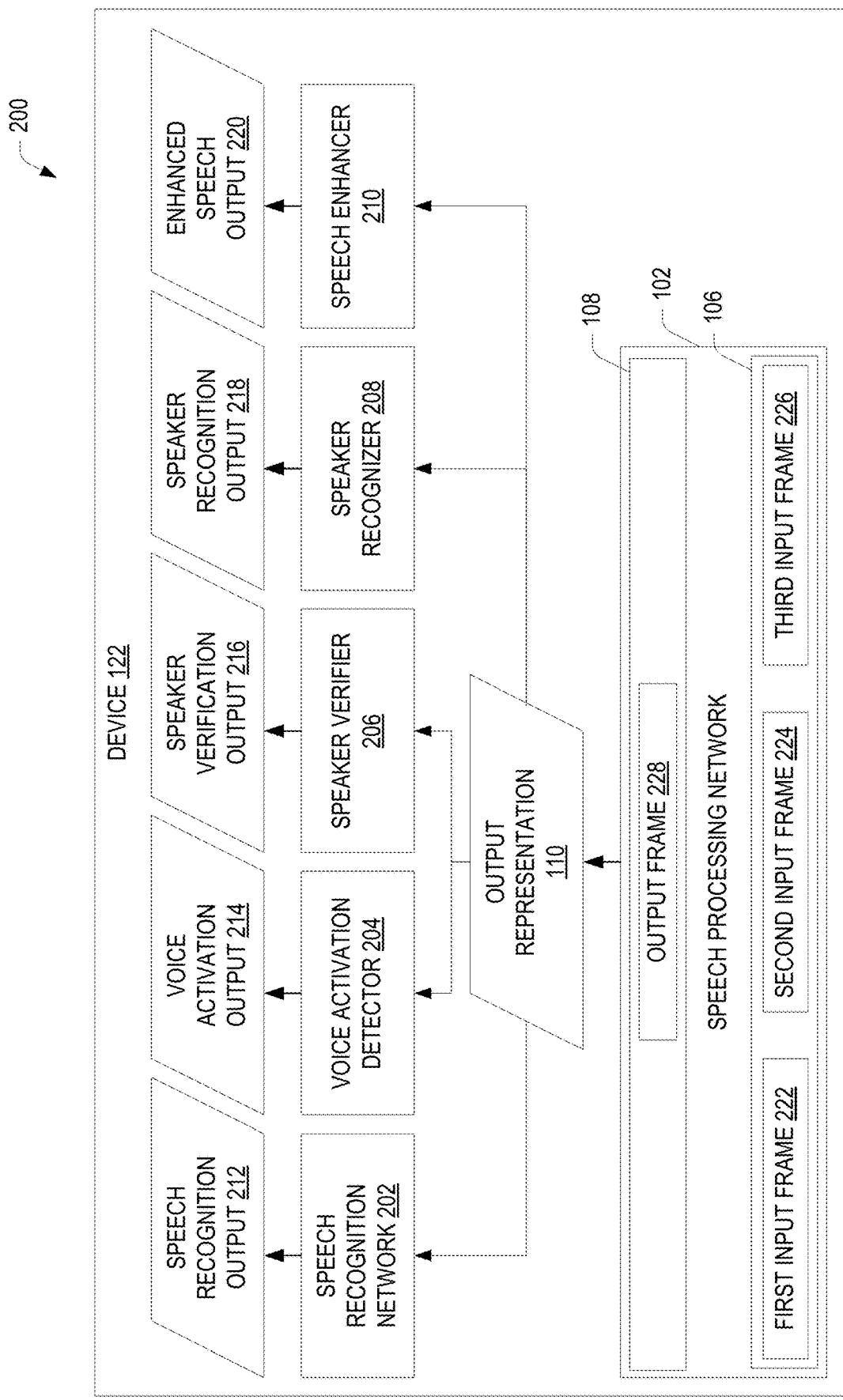
FIG. 2 is a diagram of a particular implementation of the device of FIG. 1, in accordance with some examples of the present disclosure.

FIG. 2 depicts an example 200 of components that can be implemented in the device 122 according to a particular implementation. In the example 200, the device 122 includes five speech applications that are coupled to the output 108 of the speech processing network 102 and that receive the output representation 110 as input: a speech recognition network 202, a voice activation detector 204, a speaker verifier 206, a speaker recognizer 208, and a speech enhancer 210.

The input 106 of the speech processing network 102 is configured to synchronously receive multiple frames of the audio data 126. In an illustrative example, each of the multiple frames is received from a respective microphone of the one or more microphones 124 of FIG. 1. To illustrate, a first input frame 222 is received from the first microphone 112, a second input frame 224 is received from the second microphone 114, and a third input frame 226 is received from the third microphone 116. The frames 222, 224, and 226 are received substantially concurrently at the input 106 and represent the same, or substantially the same, sampling window of captured audio (e.g., a 20 millisecond window) from the one or more microphones 124.

The speech processing network 102 is configured to process the multiple frames 222, 224, and 226 to generate a single frame 228 of the output representation 110. The output frame 228 corresponds to a common framewise embedding of the multiple frames 222, 224, and 226 received as input audio data. The output frame 228 is provided as the output representation 110 to be available for processing by the speech recognition network 202, the voice activation detector 204, the speaker verifier 206, the speaker recognizer 208, and the speech enhancer 210.

The speech recognition network 202 is configured to process the output frame 228 and to generate a speech recognition output 212 that includes decoded text (e.g., words or characters) corresponding to the captured audio. The voice activation detector 204 is configured to generate a voice activation output 214 that is representative of whether that captured audio includes a wake-up phrase (e.g., "Hey, Snapdragon"). The speaker verifier 206 is configured to generate a speaker verification output 216 indicative of whether the captured audio exhibits voice characteristics matching a particular speaker. The speaker recognizer 208 is configured to generate a speaker recognition output 218 indicating which of several stored speaker profiles available to the device 122 matches the voice characteristics of the captured audio (or indicating when none of the speaker profiles match the captured audio). The speech enhancer 210 is configured to enhance the captured audio associated with the input frames 222, 224, and 226 (e.g., denoising, echo cancellation, etc.) to generate an enhanced speech output 220, such as for use in telephony or video conferencing, recording, or playback, as illustrative, non-limiting examples.

Although three input frames are depicted, in other implementations the speech processing network 102 is configured to receive one, two, or more than three frames concurrently at the input 106. In some implementations, the input 106 is sized to receive a fixed number of frames, corresponding to an upper limit of the number of simultaneously operating microphones that can be used for speech processing. The fixed number of frames may be independent of the actual number of microphones included in, or coupled to, the device 122. In implementations in which the device 122 has (or uses) fewer microphones than the input frame capacity of the input 106, one or more portions of the input 106 may be unused (e.g., set to "0" values). In implementations in which the device 122 has (or uses) more microphones than the input frame capacity of the input 106, the audio data from one or more of the microphones may be discarded, such as by discarding the microphone input that has the lowest signal energy in a frequency range associated with speech (e.g., 20-20,000 Hertz).

Figure 3:
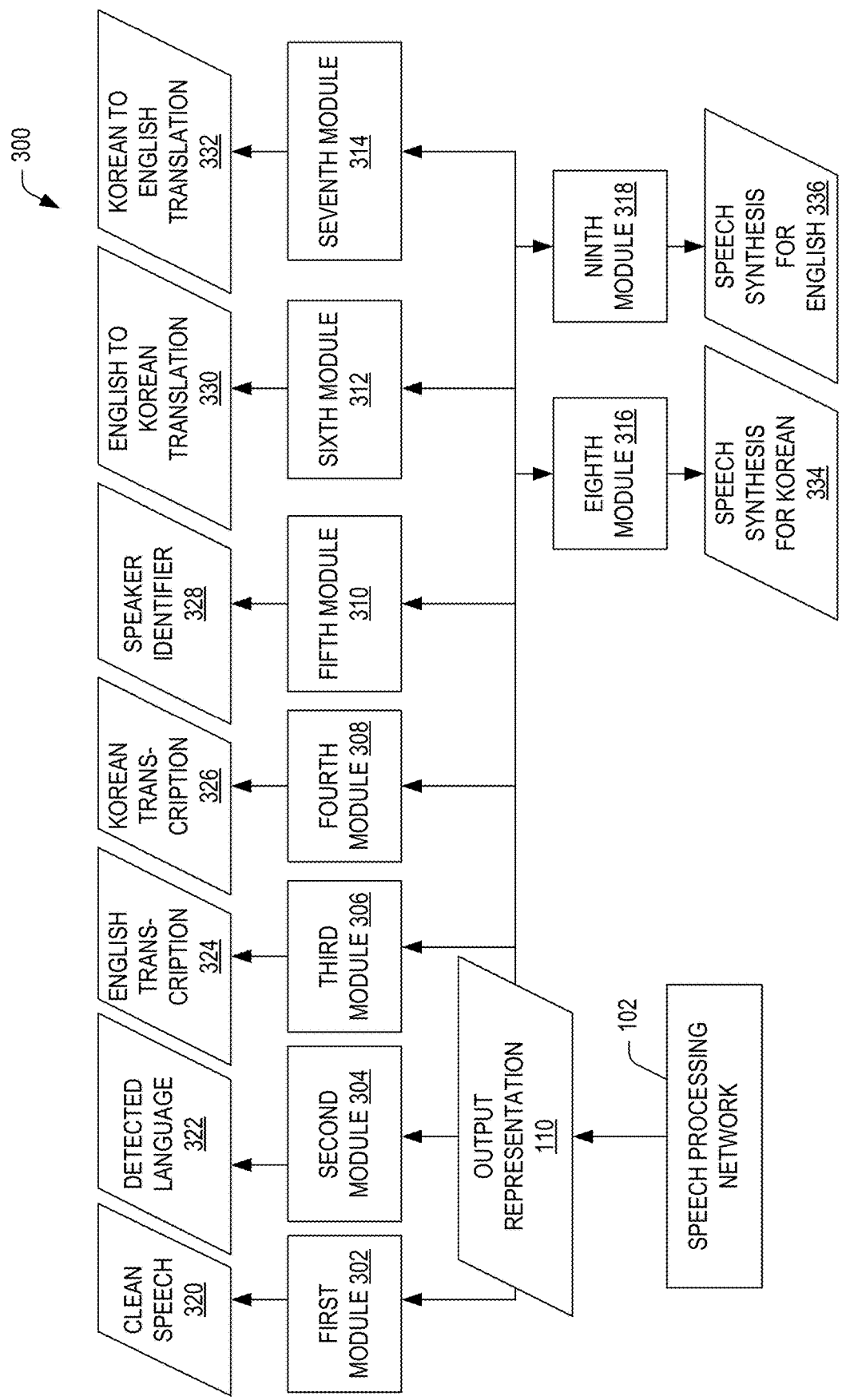
FIG. 3 is a diagram of a particular illustrative implementation of a system that includes a shared speech processing network for multiple speech applications, in accordance with some examples of the present disclosure.

Referring to FIG. 3, an illustrative example of a system 300 is shown in which the speech processing network 102 is deployed for operation of a conference call between Korean-speaking participants and English-speaking participants. The speech processing network 102 is coupled to provide the output representation 110 to each of multiple modules 302-318.

A first module 302, such as a speech enhancer, is configured to process the output representation 110 to generate clean speech 320. A second module 304, such as a language detector, is configured to process the output representation 110 to indicate a detected language 322. A third module 306, such as an English speech recognizer, is configured to process the output representation 110 to generate an English transcription 324. A fourth module 308, such as a Korean speech recognizer, is configured to process the output representation 110 to generate a Korean transcription 326. A fifth module 310, such as a speaker recognizer, is configured to process the output representation 110 to generate a speaker identifier 328.

A sixth module 312, such as a first translation model, is configured to process the output representation 110 to generate an English-to-Korean translation 330. A seventh module 314, such as a second translation model, is configured to process the output representation 110 to generate a Korean-to-English translation 332. An eighth module 316, such as a first speech synthesizer, is configured to process the output representation 110 to generate a speech synthesis for Korean 334. A ninth module 318, such as a second speech synthesizer, is configured to process the output representation 110 to generate a speech synthesis for English 336.

In some implementations, information is exchanged between one or more of the modules 302-318. In an illustrative, non-limiting example, language identification (e.g., the detected language 322) can be used for speech recognition engines for English (e.g., the third module 306) or Korean (e.g., the fourth module 308).

During operation, the speech processing network 102 can be implemented in a conference call system. Korean-speaking people at one or more first locations, each wearing a headset, and English-speaking people at one or more second locations, each wearing a headset, may connect (e.g., dial-in or otherwise establish communication) with the conference call system. Each speaker may speak during the conference call using that speaker's preferred language (e.g., Korean or English).

The system can perform several speech processing functions simultaneously. For example, speech enhancement is performed to provide a high-quality speech stream to call participants, from what may be a noisy or distorted speech input from a speaker. Each speaker's identity is detected for informing listeners of which participant is speaking. The language being spoken (e.g., Korean) is detected to transcribe and translate to the other language (e.g., English). The translated speech can be synthesized, based on which speaker uttered the speech, and played out to emulate the voice characteristics of that speaker.

Thus, the system 300 illustrates an example of a relatively large number of specific application modules performing a large variety of speech processing tasks that can be used concurrently in conjunction with the single speech processing network 102.

Figure 4:
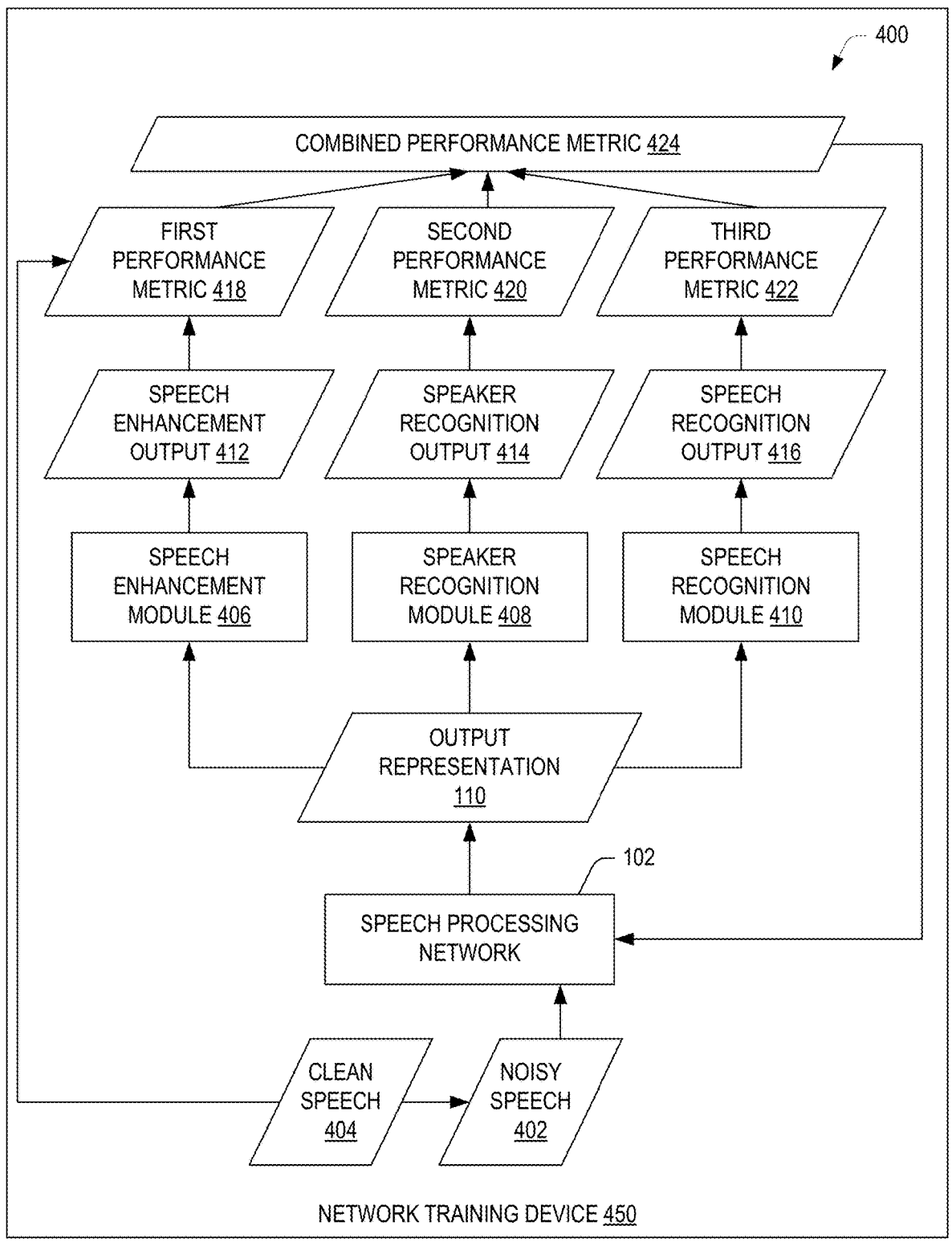
FIG. 4 is a diagram of a particular example of training a shared speech processing network for multiple speech applications, in accordance with some examples of the present disclosure.

FIG. 4 is an illustrative example of a training operation 400 in which the one or more network layers 104 of the speech processing network 102 are trained by a network training device 450 based on one or more performance metrics. In some implementations, the network training device 450 corresponds to a computing device that includes one or more processors and a memory. In an example, the network training device 450 corresponds to one or more servers or high-performance computing platforms to perform computationally intensive workloads associated with the training operation 400, and after the training operation 400 is complete, the trained speech processing network 102 is provided to the device 122 of FIG. 1. In another example, the training device 450 corresponds to the device 122 of FIG. 1 and the training operation 400 is performed by the one or more processors 150 of FIG. 1.

During the training operation 400, the output 108 of the speech processing network 102 is coupled to inputs of a speech enhancement module 406, a speaker recognition module 408, and a speech recognition module 410. Clean speech 404 is provided as training data and used to generate noisy speech 402, such as via addition of a Gaussian noise signal to the clean speech 404, as an illustrative, non-limiting example. The noisy speech 402 is input to the speech processing network 102 and processed to generate an output representation 110 corresponding to the noisy speech 402.

The speech enhancement module 406 processes the output representation 110 to generate a speech enhancement output 412. The speech enhancement output 412 is compared to the clean speech 404 to generate a first performance metric 418. For example, the first performance metric 418 can correspond to a L1 metric (e.g., an absolute value of a difference between the speech enhancement output 412 and the clean speech 404), a mean-squared error (MSE) metric, one or more other metrics based on the similarity or difference between the speech enhancement output 412 and the clean speech 404, or any combination thereof.

The speaker recognition module 408 processes the output representation 110 to generate a speaker recognition output 414. The speaker recognition output 414 is compared to speaker identification data associated with the clean speech 404 to generate a second performance metric 420 based on an accuracy of the speaker recognition output 414.

The speech recognition module 410 processes the output representation 110 to generate a speech recognition output 416. The speech recognition output 416 is compared to speech data (e.g., a transcription) associated with the clean speech 404 to generate a third performance metric 422 based on accuracy of the speech recognition output 416.

The first performance metric 418, the second performance metric 420, and the third performance metric 422 are used to generate a combined performance metric 424. For example, the combined performance metric 424 may represent a sum or average of the first performance metric 418, the second performance metric 420, and the third performance metric 422. In some implementations, weightings may be used based on relative importance or effect of each of the first performance metric 418, the second performance metric 420, or the third performance metric 422 in the training operation 400.

The first performance metric 418, the second performance metric 420, the third performance metric 422, the combined performance metric 424, or any combination thereof, is used to update coefficients of the speech processing network 102, such as via backpropagation. In some aspects, the first performance metric 418, the second performance metric 420, the third performance metric 422, the combined performance metric 424, or any combination thereof, is also used to update coefficients of one or more of the speech enhancement module 406, the speaker recognition module 408, and the speech recognition module 410. Training may continue until each of the first performance metric 418, the second performance metric 420, the third performance metric 422, and the combined performance metric 424 satisfies the respective threshold value for that particular performance metric.

In an illustrative example, the first performance metric 418 corresponds to a speech enhancement loss, the second performance metric 420 corresponds to a speaker recognition loss, and the third performance metric 422 corresponds to a speech recognition loss. Speech enhancement is known to be beneficial for a wide range (or all) speech inference problems. Speech recognition focuses on utterances regardless of the speaker's identity, and speaker recognition focuses on the speaker's identity regardless of the utterances. The speech recognition loss and the speaker recognition loss are largely disjoint from each other, while the speech enhancement loss is common for both of the speech recognition loss and the speaker recognition loss. In other words, an output representation 110 that results in poor speech enhancement at the speech enhancement module 406 will also negatively affect the accuracy of speaker recognition and speech recognition. However, an output representation 110 that results in poor speaker recognition is unlikely to negatively affect the accuracy of speech recognition, and an output representation 110 that results in poor speech recognition is unlikely to negatively affect the accuracy of speaker recognition.

By training the speech processing network 102 to generate an output representation 110 that enables accurate speech enhancement, speaker recognition, and speech recognition, the speech processing network 102 provides broad applicability for use with a wide range of speech processing applications. Although only three processing modules 406, 408, and 410 are illustrated, in other implementations one or more fewer, additional, or different speech processing modules may be used during training of the speech processing network 102.

Although the speech enhancement module 406, the speaker recognition module 408, and the speech recognition module 410 are used in the training operation 400, such modules are not necessarily the same modules depicted in FIGS. 1-3. For example, in some implementations the speech processing network 102 is provided for incorporation into a device without also providing one or more of the speech enhancement module 406, the speaker recognition module 408, and the speech recognition module 410. Other suppliers may separately provide modules to perform the various speech applications using the output of the speech processing network 102, and the separately provided modules may have different network topologies and different (e.g., improved) accuracy as compared to the corresponding modules that were used during training of the speech processing network 102.

Figure 5:
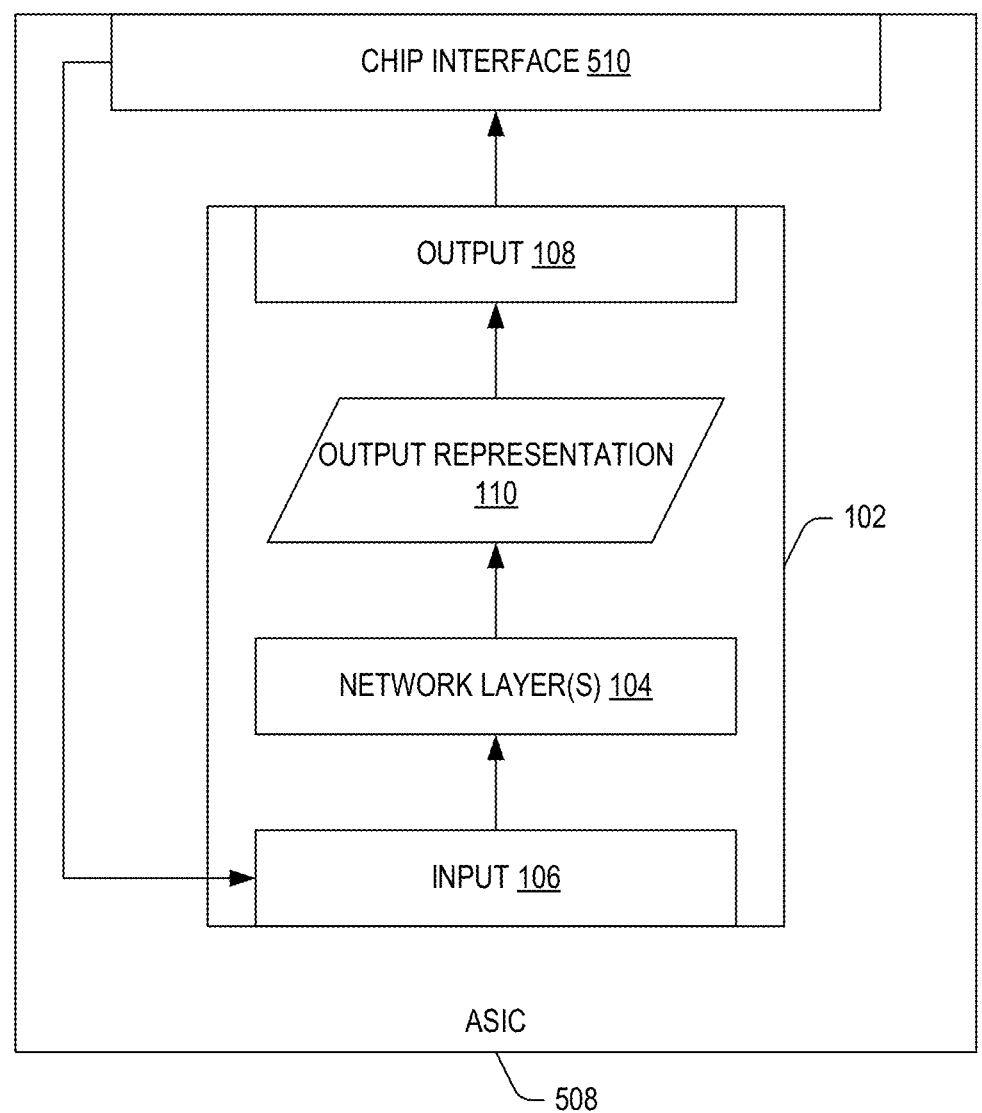
FIG. 5 illustrates an example of an integrated circuit that includes a speech processing network for multiple speech applications, in accordance with some examples of the present disclosure.

FIG. 5 depicts an example of the speech processing network 102 implemented in an application-specific integrated circuit (ASIC) 508. The input 106 of the speech processing network 102 is coupled to a chip interface 510 to enable processing of audio data received via the chip interface 510. The output 108 of the speech processing network 102 is also coupled to the chip interface 510 to enable the output representation 110 to be provided to speech application modules that are external to the ASIC 508.

In some implementations, the speech processing network 102 is implemented via a processor (e.g., the one or more processors 150 of FIG. 1). In other implementations, the speech processing network 102 is implemented in hardware, such as using dedicated circuitry corresponding to the specific network topology of the one or more network layers 104, the coefficients associated with cells of the one or more network layers 104, or both.

The ASIC 508 enables implementation of the speech processing network 102 into a variety of systems that include one or more microphones, such as a vehicle as depicted in FIG. 6, a virtual reality or augmented reality headset as depicted in FIG. 7, a wearable electronic device as depicted in FIG. 8, a voice-controlled speaker system as depicted in FIG. 9, or a wireless communication device as depicted in FIG. 11.

FIG. 6 depicts an example of a vehicle 600 that includes the speech processing network 102. According to one implementation, the vehicle 600 is a self-driving car. According to other implementations, the vehicle 600 can be a car, a truck, a motorcycle, an aircraft, a water vehicle, etc. The vehicle 600 includes multiple microphones 604 (illustrated using dashed lines to indicate internal components that are not necessarily visible to occupants of the vehicle 600) that are arranged within a cabin to enable capture of utterances by the operator and passengers of the vehicle 600. In a particular aspect, the microphones 604 correspond to the one or more microphones 124 of FIG. 1.

Audio data received from one or more of the microphones 604 can be processed by the speech processing network 102 to generate an output representation 110 for further speech application processing. For example, the vehicle 600 may include a hands-free speech interface that enables users to say a destination for a navigation application. The speech processing network 102 generates an output representation 110 based on audio data corresponding to speech of a user and provides the output representation 110 to a speech recognition module, which in turn processes the output representation 110 and provides a textual representation of the speech as an input to the navigation application. In other implementations, the navigation application processes the output representation 110 to perform speech recognition (e.g., without using an intervening speech processing module). The navigation application generates navigation directions and/or a map that may be displayed on a screen 602. Other examples include entertainment system controls, personal assistant inquiries or instructions, driver (or other occupant) authentication for security, one or more other voice-based applications, or any combination thereof.

FIG. 7 depicts an implementation 700 in which the speech processing network 102 and one or more microphones, such as the first microphone 112, are integrated in a portable electronic device that corresponds to a virtual reality, augmented reality, or mixed reality headset 702. Speech processing can be performed based on an audio signal received from the microphone 112 of the headset 702. A visual interface device, such as a screen 750, is positioned in front of the user's eyes to enable display of augmented reality or virtual reality images or scenes to the user while the headset 702 is worn. In a particular example, the screen 750 is configured to display a notification indicating results (e.g., via launching an application or navigating a graphical user interface) of processing speech received via the microphone 112. To illustrate, the speech processing network 102 generates an output representation 110 based on audio data received from the microphone 112 and provides the output representation 110 to an application. The application processes the output representation 110 and generates a notification that may be displayed on the screen 750.

FIG. 8 depicts an implementation 800 in which the device 122 is a portable electronic device that corresponds to a wearable electronic device 802, illustrated as a "smart watch." The speech processing network 102 and one or more microphones, such as the first microphone 112, are integrated into the wearable electronic device 802. Speech processing can be performed based on an audio signal received from the microphone 112 of the wearable electronic device 802. The wearable electronic device 802 includes a display screen 850 that is configured to display a notification indicating results (e.g., via launching an application or navigating a graphical user interface) of processing speech received via the microphone 112.

FIG. 9 is an illustrative example of a voice-controlled speaker system 900 in which the speech processing network 102 is implemented in an audio device that includes a wireless speaker and a voice activated device with an integrated assistant application 902. The wireless speaker and voice activated device can have wireless network connectivity and is configured to execute an assistant operation. The speech processing network 102, one or more microphones, such as the first microphone 112, and a speaker 904 are included in the wireless speaker and voice activated device. During operation, in response to receiving a verbal command via the first microphone 112, the verbal command can be processed by the speech processing network 102 and one or more other speech processing modules, such as a speech recognition module and a speaker recognition module, and results of the speech processing can be provided to the integrated assistant application 902. The integrated assistant application 902 can initiate operations responsive to the verbal command, such as adjusting a temperature, playing music, turning on lights, etc.

Figure 10:
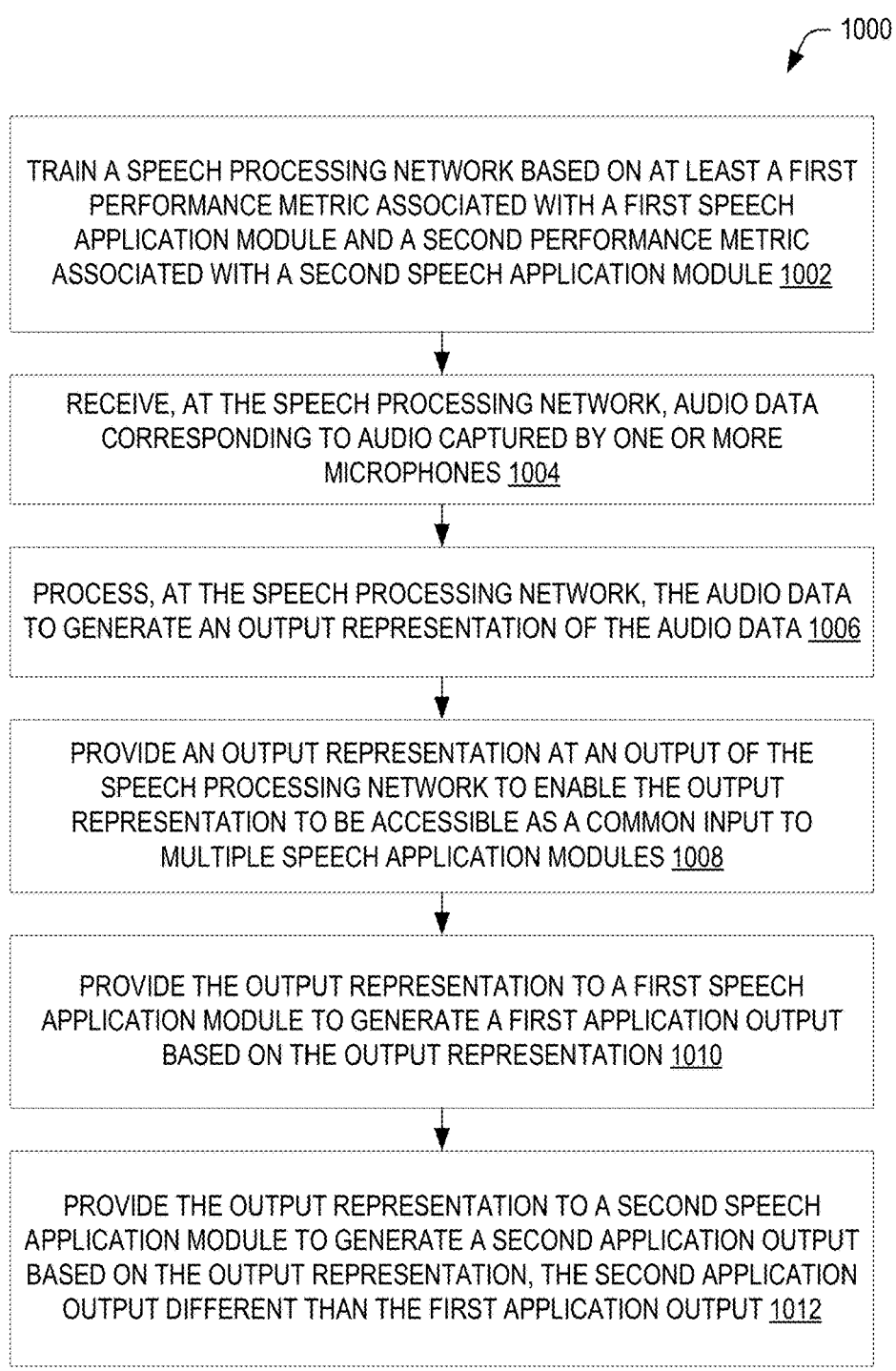
FIG. 10 is diagram of a particular implementation of a method of speech processing that may be performed by the device of FIG. 1, in accordance with some examples of the present disclosure.

Referring to FIG. 10, a flowchart of a method 1000 of speech processing is shown. The method 1000 can be performed by any of the devices or systems of FIGS. 1-9, or any combination thereof.

In some implementations, the method 1000 includes, at 1002, training a speech processing network based on at least a first performance metric associated with a first speech application module and a second performance metric associated with a second speech application module. For example, the network training device 450 of FIG. 4 performs the training operation 400 to train the speech processing network 102 based on the first performance metric 418 associated with the speech enhancement module 406, the second performance metric 420 associated with the speaker recognition module 408, and the third performance metric 422 associated with the speech recognition module 410. In some examples, the speech processing network 102 is trained responsive to a combined performance metric, such as the combined performance metric 424, that corresponds to a combination of at least the first performance metric and the second performance metric. In some examples, the first speech application module includes at least one of a speech enhancement module, a speech recognition module, or a speaker recognition module.

The method 1000 includes, at 1004, receiving, at the speech processing network, audio data corresponding to audio captured by one or more microphones. For example, the speech processing network 102 of FIG. 1 receives the audio data 126 corresponding to the audio 134 captures by the one or more microphones 124.

The method 1000 includes, at 1006, processing, at the speech processing network, the audio data to generate an output representation of the audio data. For example, the speech processing network 102 of FIG. 1 processes the audio data 126 at the one or more network layers 104 to generate the output representation 110.

The method 1000 includes, at 1008, providing the output representation at an output of the speech processing network to enable the output representation to be accessible as a common input to multiple speech application modules. As an example, the output representation 110 of FIG. 1 is provided at the output 108 to enable the output representation 110 to be accessible as a common input to the first speech application module 118 and the second speech application module 120. In some examples, the audio data is received as multiple frames that are synchronously received from respective microphones of the one or more microphones, and the speech processing network 102 processes the multiple frames to generate a single frame of the output representation, such as described with reference to the input frames 222, 224, and 226 and the output frame 228 of FIG. 2. In some implementations, the output representation is provided to a chip interface of an application-specific integrated circuit (ASIC), such as the ASIC 508 of FIG. 5, to enable the output representation to be provided to speech application modules that are external to the ASIC.

In some implementations, the method 1000 includes, at 1010, providing the output representation to a first speech application module to generate a first application output based on the output representation. In such implementations, the method 1000 also includes, at 1012, providing the output representation to a second speech application module to generate a second application output based on the output representation, the second application output different than the first application output. To illustrate, the output representation 110 is provided concurrently to the first speech application module 118 and the second application output 130 of FIG. 1, to generate the first application output 128 and the second application output 130, respectively. The second application output 130 is different than the first application output 128.

In some examples, the first application output and the second application output correspond to different ones of at least: a speech recognition output, a voice activation output, a speaker verification output, a speaker recognition output, or an enhanced speech output. For example, the first speech application module 118 and the second speech application module 120 can correspond to different ones of the speech recognition network 202, the voice activation detector 204, the speaker verifier 206, the speaker recognizer 208, or the speech enhancer 210 of FIG. 2, and the first application output 128 and the second application output 130 can correspond to different ones of the speech recognition output 212, the voice activation output 214, the speaker verification output 216, the speaker verification output 216, the speaker recognition output 218, or the enhanced speech output 220, respectively.

In some implementations, the device 122 corresponds to a communication device that further includes an antenna and a transceiver coupled to the antenna and configured to receive the audio data via wireless transmission from the one or more microphones. For example, FIG. 11 depicts an implementation in which the speech processing network 102, the antenna, and the transceiver are integrated into a mobile device, and FIG. 12 depicts an implementation in which the speech processing network 102, the antenna, and the transceiver are integrated into a base station.

Referring to FIG. 11, a block diagram of a particular illustrative implementation of a device is depicted and generally designated 1100. In various implementations, the device 1100 may have more or fewer components than illustrated in FIG. 11. In an illustrative implementation, the device 1100 may correspond to the device 122. In an illustrative implementation, the device 1100 may perform one or more operations described with reference to FIGS. 1-10.

In a particular implementation, the device 1100 includes a processor 1106 (e.g., a central processing unit (CPU)). The device 1100 may include one or more additional processors 1110 (e.g., one or more DSPs). In an illustrative, non-limiting example, the processors 1110 may include a speech and music coder-decoder (CODEC) 1108, the speech processing network 102, the first speech application module 118, the second speech application module 120, or a combination thereof. The speech and music codec 1108 may include a voice coder ("vocoder") encoder 1136, a vocoder decoder 1138, or both.

The device 1100 may include a memory 1186 and a CODEC 1134. In a particular aspect, the memory 1186 corresponds to the memory 152 of FIG. 1. The memory 1186 may include instructions 1156, that are executable by the one or more additional processors 1110 (or the processor 1106) to implement the functionality described with reference to the speech processing network 102, the first speech application module 118, the second speech application module 120, one or more other speech processing applications, the network training device 450, or any combination thereof. In a particular implementation, the memory 1186 includes a computer-readable storage medium and the instructions 1156, when executed by one or more processors (e.g., the processor 1106 or the one or more additional processors 1110), cause the one or more processors to receive, at the speech processing network 102, audio data (e.g., the audio data 126) corresponding to audio captured by one or more microphones. The instructions 1156, when executed by the one or more processors, cause the one or more processors to process, at the speech processing network 102, the audio data to generate an output representation 110 of the audio data. The instructions, when executed by the one or more processors, cause the one or more processors to provide the output representation 110 at an output 108 of the speech processing network 102 to enable the output representation 110 to be accessible as a common input to multiple speech application modules, such the first speech application module 118 and the second speech application module 120. The memory 1186 may also include speech processing model data, such as coefficients for the one or more network layers 104 of the speech processing network 102. The device 1100 may include a wireless controller 1140 coupled, via a transceiver 1150, to an antenna 1152.

The device 1100 may include a display 1128 coupled to a display controller 1126. A speaker 1192 and one or more microphones, such as the microphone 112, may be coupled to the CODEC 1134. The CODEC 1134 may include a digital-to-analog converter 1102 and an analog-to-digital converter 1104. In a particular implementation, the CODEC 1134 may receive analog signals from the microphone 112, convert the analog signals to digital signals using the analog-to-digital converter 1104, and provide the digital signals to the speech and music codec 1108. The speech and music codec 1108 may process the digital signals, and the digital signals may further be processed by the speech processing network 102. In a particular implementation, the speech and music codec 1108 may provide digital signals to the CODEC 1134. The CODEC 1134 may convert the digital signals to analog signals using the digital-to-analog converter 1102 and may provide the analog signals to the speaker 1192.

In a particular implementation, the device 1100 may be included in a system-in-package or system-on-chip device 1122. In a particular implementation, the memory 1186, the processor 1106, the processors 1110, the display controller 1126, the CODEC 1134, and the wireless controller 1140 are included in a system-in-package or system-on-chip device 1122. In a particular implementation, an input device 1130 and a power supply 1144 are coupled to the system-on-chip device 1122. Moreover, in a particular implementation, as illustrated in FIG. 11, the display 1128, the input device 1130, the speaker 1192, the microphone 112, the antenna 1152, and the power supply 1144 are external to the system-on-chip device 1122. In a particular implementation, each of the display 1128, the input device 1130, the speaker 1192, the microphone 112, the antenna 1152, and the power supply 1144 may be coupled to a component of the system-on-chip device 1122, such as an interface or a controller.

The device 1100 may include a smart speaker, a speaker bar, a mobile communication device, a smart phone, a cellular phone, a laptop computer, a computer, a tablet, a personal digital assistant, a display device, a television, a gaming console, a music player, a radio, a digital video player, a digital video disc (DVD) player, a tuner, a camera, a navigation device, a vehicle, a headset, an augmented reality headset, a virtual reality headset, an aerial vehicle, or any combination thereof.

Referring to FIG. 12, a block diagram of a particular illustrative example of a base station 1200 is depicted. In various implementations, the base station 1200 may have more components or fewer components than illustrated in FIG. 12. In an illustrative example, the base station 1200 may include one or more components of the device 122 of FIG. 1. In an illustrative example, the base station 1200 may operate according to one or more of the methods or systems described with reference to FIGS.

The base station 1200 may be part of a wireless communication system. The wireless communication system may include multiple base stations and multiple wireless devices. The wireless communication system may be a Long Term Evolution (LTE) system, a Code Division Multiple Access (CDMA) system, a Global System for Mobile Communications (GSM) system, a wireless local area network (WLAN) system, or some other wireless system. A CDMA system may implement Wideband CDMA (WCDMA), CDMA 1x, Evolution-Data Optimized (EVDO), Time Division Synchronous CDMA (TD-SCDMA), or some other version of CDMA.

The wireless devices may also be referred to as user equipment (UE), a mobile station, a terminal, an access terminal, a subscriber unit, a station, etc. The wireless devices may include a cellular phone, a smartphone, a tablet, a wireless modem, a personal digital assistant (PDA), a handheld device, a laptop computer, a smartbook, a netbook, a tablet, a cordless phone, a wireless local loop (WLL) station, a Bluetooth device, etc. The wireless devices may include or correspond to the device 1100 of FIG. 11.

Various functions may be performed by one or more components of the base station 1200 (and/or in other components not shown), such as sending and receiving messages and data (e.g., audio data). In a particular example, the base station 1200 includes a processor 1206 (e.g., a CPU). The base station 1200 may include a transcoder 1210. The transcoder 1210 may include an audio CODEC 1208 that includes the speech processing network 102. For example, the transcoder 1210 may include one or more components (e.g., circuitry) configured to perform operations of the audio CODEC 1208. As another example, the transcoder 1210 may be configured to execute one or more computer-readable instructions to perform the operations of the audio CODEC 1208. Although the audio CODEC 1208 is illustrated as a component of the transcoder 1210, in other examples one or more components of the audio CODEC 1208 may be included in the processor 1206, another processing component, or a combination thereof. For example, a decoder 1238 (e.g., a vocoder decoder) may be included in a receiver data processor 1264. As another example, an encoder 1236 (e.g., a vocoder encoder) may be included in a transmission data processor 1282.

The transcoder 1210 may function to transcode messages and data between two or more networks. The transcoder 1210 may be configured to convert message and audio data from a first format (e.g., a digital format) to a second format. To illustrate, the decoder 1238 may decode encoded signals having a first format and the encoder 1236 may encode the decoded signals into encoded signals having a second format. The transcoder 1210 may also be configured to perform, with use of the speech processing network 102, speech enhancement, speech recognition, translations from one language to another, or one or more other speech processing applications as described with reference to FIGS. 1-11. Additionally or alternatively, the transcoder 1210 may be configured to perform data rate adaptation. For example, the transcoder 1210 may down-convert a data rate or up-convert the data rate without changing a format the audio data. To illustrate, the transcoder 1210 may down-convert 124 kbit/s signals into 16 kbit/s signals.

The base station 1200 may include a memory 1232. The memory 1232, such as a computer-readable storage device, may include instructions. The instructions may include one or more instructions that are executable by the processor 1206, the transcoder 1210, or a combination thereof, to perform one or more operations described with reference to the methods and systems of FIGS. 1-11. The base station 1200 may include multiple transmitters and receivers (e.g., transceivers), such as a first transceiver 1252 and a second transceiver 1254, coupled to an array of antennas. The array of antennas may include a first antenna 1242 and a second antenna 1244. The array of antennas may be configured to wirelessly communicate with one or more wireless devices, such as the device 1100 of FIG. 11. For example, the second antenna 1244 may receive a data stream 1214 (e.g., a bitstream) from a wireless device. The data stream 1214 may include messages, data (e.g., encoded speech data), or a combination thereof.

The base station 1200 may include a network connection 1260, such as backhaul connection. The network connection 1260 may be configured to communicate with a core network or one or more base stations of the wireless communication network. For example, the base station 1200 may receive a second data stream (e.g., messages or audio data) from a core network via the network connection 1260. The base station 1200 may process the second data stream to generate messages or audio data and provide the messages or the audio data to one or more wireless device via one or more antennas of the array of antennas or to another base station via the network connection 1260. In a particular implementation, the network connection 1260 may be a wide area network (WAN) connection, as an illustrative, non-limiting example. In some implementations, the core network may include or correspond to a Public Switched Telephone Network (PSTN), a packet backbone network, or both.

The base station 1200 may include a media gateway 1270 that is coupled to the network connection 1260 and the processor 1206. The media gateway 1270 may be configured to convert between media streams of different telecommunications technologies. For example, the media gateway 1270 may convert between different transmission protocols, different coding schemes, or both. To illustrate, the media gateway 1270 may convert from PCM signals to Real-Time Transport Protocol (RTP) signals, as an illustrative, non-limiting example. The media gateway 1270 may convert data between packet switched networks (e.g., a Voice Over Internet Protocol (VoIP) network, an IP Multimedia Subsystem (IMS), a fourth generation (4G) wireless network, such as LTE, WiMax, and UMB, etc.), circuit switched networks (e.g., a PSTN), and hybrid networks (e.g., a second generation (2G) wireless network, such as GSM, GPRS, and EDGE, a third generation (3G) wireless network, such as WCDMA, EV-DO, and HSPA, etc.).

Additionally, the media gateway 1270 may include a transcoder and may be configured to transcode data when codecs are incompatible. For example, the media gateway 1270 may transcode between an Adaptive Multi-Rate (AMR) codec and a G.711 codec, as an illustrative, non-limiting example. The media gateway 1270 may include a router and a plurality of physical interfaces. In some implementations, the media gateway 1270 may also include a controller (not shown). In a particular implementation, the media gateway controller may be external to the media gateway 1270, external to the base station 1200, or both. The media gateway controller may control and coordinate operations of multiple media gateways. The media gateway 1270 may receive control signals from the media gateway controller and may function to bridge between different transmission technologies and may add service to end-user capabilities and connections.

The base station 1200 may include a demodulator 1262 that is coupled to the transceivers 1252, 1254, the receiver data processor 1264, and the processor 1206, and the receiver data processor 1264 may be coupled to the processor 1206. The demodulator 1262 may be configured to demodulate modulated signals received from the transceivers 1252, 1254 and to provide demodulated data to the receiver data processor 1264. The receiver data processor 1264 may be configured to extract a message or audio data from the demodulated data and send the message or the audio data to the processor 1206.

The base station 1200 may include a transmission data processor 1282 and a transmission multiple input-multiple output (MIMO) processor 1284. The transmission data processor 1282 may be coupled to the processor 1206 and the transmission MIMO processor 1284. The transmission MIMO processor 1284 may be coupled to the transceivers 1252, 1254 and the processor 1206. In some implementations, the transmission MIMO processor 1284 may be coupled to the media gateway 1270. The transmission data processor 1282 may be configured to receive the messages or the audio data from the processor 1206 and to code the messages or the audio data based on a coding scheme, such as CDMA or orthogonal frequency-division multiplexing (OFDM), as an illustrative, non-limiting examples. The transmission data processor 1282 may provide the coded data to the transmission MIMO processor 1284.

The coded data may be multiplexed with other data, such as pilot data, using CDMA or OFDM techniques to generate multiplexed data. The multiplexed data may then be modulated (i.e., symbol mapped) by the transmission data processor 1282 based on a particular modulation scheme (e.g., Binary phase-shift keying ("BPSK"), Quadrature phase-shift keying ("QSPK"), M-ary phase-shift keying ("M-PSK"), M-ary Quadrature amplitude modulation ("M-QAM"), etc.) to generate modulation symbols. In a particular implementation, the coded data and other data may be modulated using different modulation schemes. The data rate, coding, and modulation for each data stream may be determined by instructions executed by processor 1206.

The transmission MIMO processor 1284 may be configured to receive the modulation symbols from the transmission data processor 1282 and may further process the modulation symbols and may perform beamforming on the data. For example, the transmission MIMO processor 1284 may apply beamforming weights to the modulation symbols. The beamforming weights may correspond to one or more antennas of the array of antennas from which the modulation symbols are transmitted.

During operation, the second antenna 1244 of the base station 1200 may receive a data stream 1214. The second transceiver 1254 may receive the data stream 1214 from the second antenna 1244 and may provide the data stream 1214 to the demodulator 1262. The demodulator 1262 may demodulate modulated signals of the data stream 1214 and provide demodulated data to the receiver data processor 1264. The receiver data processor 1264 may extract audio data from the demodulated data and provide the extracted audio data to the processor 1206.

The processor 1206 may provide the audio data to the transcoder 1210 for transcoding. The decoder 1238 of the transcoder 1210 may decode the audio data from a first format into decoded audio data and the encoder 1236 may encode the decoded audio data into a second format. In some implementations, the encoder 1236 may encode the audio data using a higher data rate (e.g., up-convert) or a lower data rate (e.g., down-convert) than received from the wireless device. In other implementations, the audio data may not be transcoded. Although transcoding (e.g., decoding and encoding) is illustrated as being performed by a transcoder 1210, the transcoding operations (e.g., decoding and encoding) may be performed by multiple components of the base station 1200. For example, decoding may be performed by the receiver data processor 1264 and encoding may be performed by the transmission data processor 1282. In other implementations, the processor 1206 may provide the audio data to the media gateway 1270 for conversion to another transmission protocol, coding scheme, or both. The media gateway 1270 may provide the converted data to another base station or core network via the network connection 1260.

Encoded audio data generated at the encoder 1236, such as transcoded data, may be provided to the transmission data processor 1282 or the network connection 1260 via the processor 1206. The transcoded audio data from the transcoder 1210 may be provided to the transmission data processor 1282 for coding according to a modulation scheme, such as OFDM, to generate the modulation symbols. The transmission data processor 1282 may provide the modulation symbols to the transmission MIMO processor 1284 for further processing and beamforming. The transmission MIMO processor 1284 may apply beamforming weights and may provide the modulation symbols to one or more antennas of the array of antennas, such as the first antenna 1242 via the first transceiver 1252. Thus, the base station 1200 may provide a transcoded data stream 1216, that corresponds to the data stream 1214 received from the wireless device, to another wireless device. The transcoded data stream 1216 may have a different encoding format, data rate, or both, than the data stream 1214. In other implementations, the transcoded data stream 1216 may be provided to the network connection 1260 for transmission to another base station or a core network.

In conjunction with the described techniques, an apparatus includes means for receiving audio data corresponding to audio captured by one or more microphones. For example, the means for receiving may include the input 106, the chip interface 510, the codec 1134, one or more other devices, circuits, or modules configured to receive audio data, or any combination thereof.

The apparatus also includes means for processing the audio data to generate an output representation of the audio data. For example, the means for processing may include the speech processing network 102, the one or more network layers 104, the one or more processors 150, the processor 1106, the one or more processors 1110, one or more other devices, circuits, or modules, configured to generate an output representation of the data, or any combination thereof.

The apparatus also includes means for providing the output representation to be accessible as a common input to multiple means for performing speech applications. The means for providing the output representation may include the output 108, the chip interface 510, the one or more processors 150, the processor 1106, the one or more processors 1110, one or more other devices, circuits, or modules configured to provide the output representation to be accessible as a common input to multiple means for performing speech applications, or any combination thereof. The multiple means for performing speech applications can correspond to the first speech application module 118, the second speech application module 120, the speech recognition network 202, the voice activation detector 204, the speaker recognizer 208, the speech enhancer 210, any one or more of the modules 302-318 of FIG. 3, any one or more of the modules 406-410 of FIG. 4, or any combination thereof.

In some implementations, the means for processing the audio data is implemented in an application-specific integrated circuit (ASIC), and the means for providing the output representation is coupled to means for performing speech applications that are external to the ASIC. For example, FIG. 5 depicts the speech processing network 102 implemented in the ASIC 508, and the output 108 can be coupled, via the chip interface 510, to one or more of the modules 118, 120, 202-210, 302-314, 406-410 that are external to the ASIC 508 and that are coupled to the chip interface 510 to receive the output representation 110.

In some implementations, the apparatus also includes means for generating a first application output based on the output representation and includes means for generating a second application output based on the output representation. The means for generating the first application output is coupled to the means for providing the output representation, the means for generating the second application output is coupled to the means for providing the output representation, and the second application output is different than the first application output. The first application output may correspond to at least one of: a speech recognition output; a voice activation output; a speaker verification output; a speaker recognition output; or an enhanced speech output. For example, the means for generating the first application output may correspond to one or more of the modules 118, 120, 202-210, 302-314, 406-410, and the means for generating the second application output may correspond to a different one of the modules 118, 120, 202-210, 302-314, 406-410.

It should be noted that various functions performed by the one or more components of the systems and devices disclosed herein are described as being performed by certain components or modules. This division of components and modules is for illustration only. In an alternate implementation, a function performed by a particular component or module may be divided amongst multiple components or modules. Moreover, in an alternate implementation, two or more components or modules may be integrated into a single component or module. Each component or module may be implemented using hardware (e.g., a field-programmable gate array (FPGA) device, an application-specific integrated circuit (ASIC), a DSP, a controller, etc.), software (e.g., instructions executable by a processor), or any combination thereof.

Those of skill would further appreciate that the various illustrative logical blocks, configurations, modules, circuits, and algorithm steps described in connection with the implementations disclosed herein may be implemented as electronic hardware, computer software executed by a processing device such as a hardware processor, or combinations of both. Various illustrative components, blocks, configurations, modules, circuits, and steps have been described above generally in terms of their functionality. Whether such functionality is implemented as hardware or executable software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the implementations disclosed herein may be embodied directly in hardware, in a software module executed by a processor, or in a combination of the two. A software module may reside in a memory device, such as random access memory (RAM), magnetoresistive random access memory (MRAM), spin-torque transfer MRAM (STT-MRAM), flash memory, read-only memory (ROM), programmable read-only memory (PROM), erasable programmable read-only memory (EPROM), electrically erasable programmable read-only memory (EEPROM), registers, hard disk, a removable disk, or a compact disc read-only memory (CD-ROM). An exemplary memory device is coupled to the processor such that the processor can read information from, and write information to, the memory device. In the alternative, the memory device may be integral to the processor. The processor and the storage medium may reside in an application-specific integrated circuit (ASIC). The ASIC may reside in a computing device or a user terminal. In the alternative, the processor and the storage medium may reside as discrete components in a computing device or a user terminal.

The previous description of the disclosed implementations is provided to enable a person skilled in the art to make or use the disclosed implementations. Various modifications to these implementations will be readily apparent to those skilled in the art, and the principles defined herein may be applied to other implementations without departing from the scope of the disclosure. Thus, the present disclosure is not intended to be limited to the implementations shown herein but is to be accorded the widest scope possible consistent with the principles and novel features as defined by the following claims.

What is claimed is:

1. A device to process speech, comprising:
a speech processing network comprising:
an input configured to receive audio data;
one or more network layers configured to process the audio data to generate a network output; and
an output configured to be coupled to multiple speech application modules to enable the network output to be provided as a common input to each of the multiple speech application modules.

2. The device of claim 1, wherein a first speech application module corresponding to a speaker verifier is coupled to the output and configured to generate a speaker verification output based on the network output, and wherein the speaker verification output is indicative of whether the audio data corresponds to audio that exhibits voice characteristics matching a particular speaker.

3. The device of claim 2, wherein a second speech application module corresponding to a speech recognition network is coupled to the output and configured to generate a speech recognition output based on the network output, and wherein the speech recognition output includes text corresponding to detected speech.

4. The device of claim 1, wherein the multiple speech application modules include a voice activation detector coupled to the output.

5. The device of claim 1, wherein the multiple speech application modules include a speaker recognizer coupled to the output.

6. The device of claim 1, wherein the multiple speech application modules include a speech enhancer coupled to the output.

7. The device of claim 1, wherein the one or more network layers are trained based on at least a first performance metric associated with a first speech application module and a second performance metric associated with a second speech application module.

8. The device of claim 7, wherein the one or more network layers are trained responsive to a combined performance metric that corresponds to a combination of at least the first performance metric and the second performance metric.

9. The device of claim 1, wherein the speech processing network is implemented in an application-specific integrated circuit (ASIC), wherein at least one speech application module of the multiple speech application modules is external to the ASIC, and wherein the output of the speech processing network is coupled to a chip interface to enable the network output to be provided to the at least one speech application module that is external to the ASIC.

10. The device of claim 1, wherein the input is configured to synchronously receive multiple frames of the audio data, and wherein the speech processing network is configured to process the multiple frames to generate a single frame of the network output.

11. The device of claim 10, wherein the audio data corresponds to audio captured by multiple microphones, and wherein each of the multiple frames is from a respective microphone of the multiple microphones.

12. The device of claim 1, wherein the speech processing network is included in a vehicle.

13. The device of claim 1, wherein the speech processing network is implemented in an audio device, and wherein the audio device includes a wireless speaker and voice activated device with an integrated assistant application.

14. The device of claim 1, further comprising:
an antenna; and
a transceiver coupled to the antenna and configured to receive the audio data via wireless transmission.

15. The device of claim 14, wherein the speech processing network, the antenna, and the transceiver are integrated into a mobile device.

16. A method of speech processing, comprising:
receiving audio data at an input of a speech processing network;
processing, at the speech processing network, the audio data using one or more network layers to generate a network output; and
providing the network output at an output of the speech processing network to enable the network output to be accessible as a common input to multiple speech application modules.

17. The method of claim 16, further comprising generating, at a first speech application module, a speaker verification output based on the network output and indicative of whether the audio data corresponds to audio that exhibits voice characteristics matching a particular speaker.

18. The method of claim 17, further comprising generating, at a second speech application module, a speech recognition output based on the network output and including text corresponding to detected speech.

19. The method of claim 16, further comprising providing the network output to a speech application module to generate at least one of:
a voice activation output;
a speaker recognition output; or
an enhanced speech output.

20. The method of claim 16, further comprising training the speech processing network based on at least a first performance metric associated with a first speech application module and a second performance metric associated with a second speech application module.

21. The method of claim 20, wherein the speech processing network is trained responsive to a combined performance metric that corresponds to a combination of at least the first performance metric and the second performance metric.

22. The method of claim 16, wherein the network output is provided to a chip interface of an application-specific integrated circuit (ASIC) to enable the network output to be provided to at least one speech application module of the multiple speech application modules that is external to the ASIC.

23. The method of claim 16, wherein the audio data is received as multiple frames that are synchronously received, and wherein the speech processing network processes the multiple frames to generate a single frame of the network output.

24. The method of claim 23, wherein the audio data corresponds to audio captured by multiple microphones, and wherein each of the multiple frames is from a respective microphone of the multiple microphones.

25. A non-transitory computer-readable medium storing instructions that, when executed by one or more processors, cause the one or more processors to:
receive audio data at an input of a speech processing network;
process, at the speech processing network, the audio data using one or more network layers to generate a network output; and
provide the network output at an output of the speech processing network to enable the network output to be accessible as a common input to multiple speech application modules.

26. The non-transitory computer-readable medium of claim 25, wherein execution of the instructions further causes the one or more processors to:
provide the network output to a first speech application module to generate a speaker verification output based on the network output; and
provide the network output to a second speech application module to generate a speech recognition output based on the network output.

27. The non-transitory computer-readable medium of claim 25, wherein execution of the instructions further causes the one or more processors to train the speech processing network based on at least a first performance metric associated with a first speech application module and a second performance metric associated with a second speech application module.

28. The non-transitory computer-readable medium of claim 27, wherein the speech processing network is trained responsive to a combined performance metric that corresponds to a combination of at least the first performance metric and the second performance metric.

29. An apparatus comprising:
means for receiving audio data corresponding to audio;
means for processing the audio data using one or more network layers to generate a network output; and
means for providing the network output to be accessible as a common input to multiple means for performing speech applications.

30. The apparatus of claim 29, wherein the means for processing the audio data is implemented in an application-specific integrated circuit (ASIC), wherein at least one of the multiple means for performing speech applications is external to the ASIC, and wherein the means for providing the network output is coupled to the at least one of the means for performing speech applications that is external to the ASIC.

* * * * *